US 6,700,305 B2

(12) United States Patent
Matsuda et al.

(10) Patent No.: US 6,700,305 B2
(45) Date of Patent: Mar. 2, 2004

(54) ACTUATOR USING A PIEZOELECTRIC ELEMENT

(75) Inventors: Shinya Matsuda, Takarazuka (JP); Takashi Matsuo, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/738,070

(22) Filed: Dec. 15, 2000

(65) Prior Publication Data

US 2002/0014812 A1 Feb. 7, 2002

(30) Foreign Application Priority Data

Dec. 20, 1999 (JP) .......................................... 11-360371

(51) Int. Cl.[7] .............................................. H01L 41/08
(52) U.S. Cl. ........................... 310/323.16; 310/323.17; 310/328
(58) Field of Search ........................... 310/328, 323.02, 310/323.16, 323.17; 271/267

(56) References Cited

U.S. PATENT DOCUMENTS

| 4,613,782 | A | * | 9/1986 | Mori et al. ............. 310/323.16 |
| 4,997,177 | A | * | 3/1991 | Mori et al. ................... 271/267 |
| 5,036,245 | A | * | 7/1991 | Ohnishi et al. ............. 310/323 |
| 5,071,113 | A | * | 12/1991 | Nakamura et al. ........... 271/267 |
| 5,424,597 | A | * | 6/1995 | Gloss et al. .................. 310/328 |
| 5,563,465 | A | * | 10/1996 | Nakahara et al. ............ 310/328 |
| 5,900,691 | A | * | 5/1999 | Reuter et al. ................ 310/348 |
| 6,201,340 | B1 | * | 3/2001 | Matsuda et al. ............. 310/328 |

OTHER PUBLICATIONS

"Development of a Small Actuator with Three Degrees of Rotational Freedom (1st Report)—Motion Analysis of the Drive Unit" by Keisuke Sasae et al., Journal of Precision Engineering Institution, vol. 61, No. 3, pp. 386–390, 1995.

"Development of a Small Actuator with Three Degrees of Rotational Freedom (2nd Report)—Simulation and Experiment of a Friction Drive" by Keisuke Sasae et al., Journal of Precision Engineering Institution, vol. 61, No. 4, pp. 532–536, 1995.

"Development of a Small Actuator with Three Degrees of Rotational Freedom (3rd Report)—Design and Experiment of a Spherical Actuator" by Keisuke Sasae et al., Journal of Precision Engineering Institution, vol. 62, No. 4, pp. 599–603, 1996.

Section 2, entitled "Explanation of a Driving Principle and Configuration of an Ultrasonic Linear Actuator", by S. Nagatome et al., *Manufacture and Estimation of Thin Ultrasonic Linear Motor*, Collection of Lecture of Precision Engineering Institution, p. 544, Spring 1998.

* cited by examiner

*Primary Examiner*—Karl Tamai
(74) *Attorney, Agent, or Firm*—Sidley Austin Brown & Wood LLP

(57) ABSTRACT

The present invention is an actuator using a piezoelectric element as a displacement element, wherein a drive signal voltage and current are reduced, and power consumption is reduced, while output is increased. A structure comprising two displacement units of laminate-type piezoelectric elements 10 and 10' and elastic elements 25 and 25' resonated by the piezoelectric elements are arranged so as to mutually intersect, and a tip 20 provided at the intersection point of the elastic members 25 and 25' describes a circular path or elliptical path, and moves a rotor 40. The oscillation of the piezoelectric elements 10 and 10' is suppressed by the elastic members 25 and 25', so as to set the phase of the electromotive force produced by the voltage effect of the piezoelectric elements 10 and 10' themselves to the opposite of the phase of the drive signal, thereby reducing current consumption. Making the spring constant of the elastic members 25 and 25' smaller than the spring constant of the piezoelectric elements 10 and 10' expands the displacement of the elastic members 25 and 25' greater than the displacement of the piezoelectric elements 10 and 10'.

24 Claims, 6 Drawing Sheets

Piezoelectric Elements 10,10'

Elastic Elements 25,25'

30

ACTUATOR USING A PIEZOELECTRIC ELEMENT

This application is based on Patent Application No. 11-360371 filed in Japan, the content of which is hereby incorporated by reference.

BACKGROUND OF THE INVENTION

1. Field of the Invention

The present invention relates to an actuator using a displacement element such as a piezoelectric element and the like.

2. Description of the Related Art

In the field of actuators using a displacement element such as a piezoelectric element, the object of improving drive efficiency has resulted in the proposal of actuators which drive a displacement element such as a single plate piezoelectric ceramic or the like to oscillate an elastic member at a resonance frequency, and actuators which drive a laminate-type displacement element formed of laminations of a plurality of piezoelectric ceramic thin plates itself at a resonance frequency.

When the former single plate displacement element is used, there is scant internal loss of the displacement element itself, since the drive force generated by the displacement element is transferred to the elastic member without attenuation. Accordingly, the drive efficiency is high. However, since the total surface area of the displacement element is small and the impedance is high, the drive voltage must be increased in order to increase the output. Particularly when used in a portable device, several batteries must be used, or a booster circuit must be used. For this reason such a solution is contrary to the demand for lower cost and more compact and lighter weight devices.

When the latter laminate-type displacement element is used, the total area of the displacement element is increased by the laminate plates, and impedance is reduced by the resonance, such that a large output can be obtained using a low drive voltage. However, there is a large internal loss due to use of electrodes and adhesive between each piezoelectric ceramic thin plate. Accordingly, there is an increased attenuation of the drive force generated by the displacement element, and relatively low drive efficiency. Furthermore, when used in portable devices, the battery consumption is comparatively rapid, necessitating frequent battery replacement.

OBJECTS AND SUMMARY

An object of the present invention is to provide an improved actuator.

Another object of the present invention is to provide an actuator using a low drive voltage and low power consumption.

A still further object of the present invention is to provide an actuator having a high drive efficiency.

These and other objects are attained by one aspect of the present invention providing a displacement element for generating a specific displacement by piezoelectric effect, a displacement expander for transmitting the displacement of the displacement element and expanding this displacement, a transmitter for transmitting the displacement expanded by the displacement expander to a driven member, and a presser for pressing the transmitter against the driven member, wherein the oscillation of the displacement element is restrained by the oscillation of the displacement expander.

The spring constant of the displacement expander is desirably less than the spring constant of the displacement element.

It is further desirable that the displacement element is driven by a drive signal of a frequency near the simple natural frequency of the displacement expander.

It is still further desirable that the displacement element is a laminate-type piezoelectric element.

In this way the actuator of the present invention sets the phase of the electromotive force to the reverse of the phase of the drive signal by piezoelectric effect of the piezoelectric element, thereby making it possible to reduce the drive voltage.

The displacement of the displacement element can be expanded by the displacement expander by setting the spring constant of the displacement expander smaller than the spring constant of the displacement element, thereby making it possible to obtain a greater output with less power consumption.

The current flowing to the displacement element can be minimized by driving the displacement element by a drive frequency of a frequency near the simple natural frequency of the displacement element, thereby minimizing power consumption.

The displacement element formed as a laminate type piezoelectric element, thereby allowing reduction of the drive voltage of the displacement element.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The embodiment of a truss-type actuator of the present invention is described hereinafter.

Figure 1:
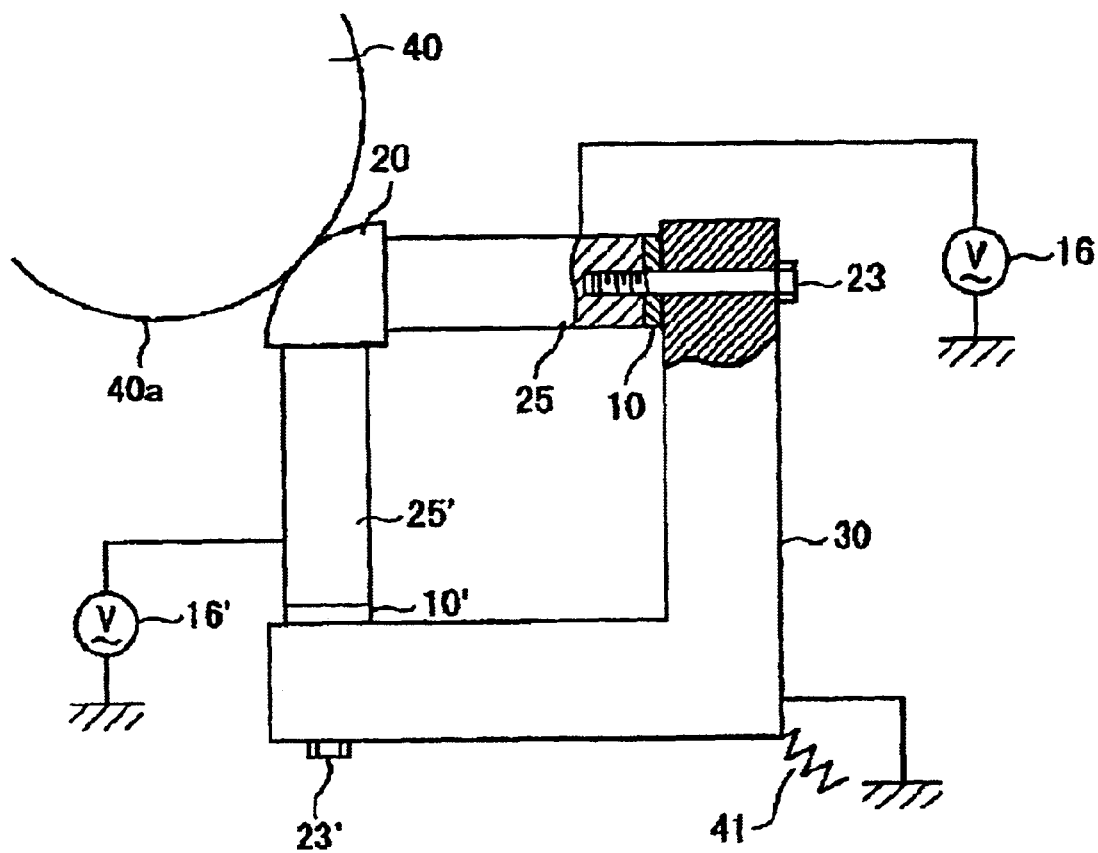
FIG. 1 is a schematic view showing the structure of a truss-type actuator.

FIG. 1 shows the structure of a truss-type actuator. As shown in FIG. 1, the displacement element comprises metal elastic members 25 and 25' connected in series to a first piezoelectric element 10 and second piezoelectric element 10' so as to intersect at an approximate right angle. At the intersection end is adhered a tip member (displacement combining unit) 20 via adhesive. The base ends of the first piezoelectric element 10 and the second piezoelectric element 10' are respectively mounted to a base member 30 via bolts 23 and 23'.

The material of the tip 20 is desirably tungsten or the like having excellent wear resistance so as to obtain stability and high friction coefficient. The material of the base 30 is desirably stainless steel or the like having excellent strength and ease of manufacture. The material of the elastic members 25 and 25' is desirable aluminum, titanium, iron, copper, or alloys thereof. The adhesive is desirably an epoxy resin or the like having excellent strength and adhesion.

Figure 2:
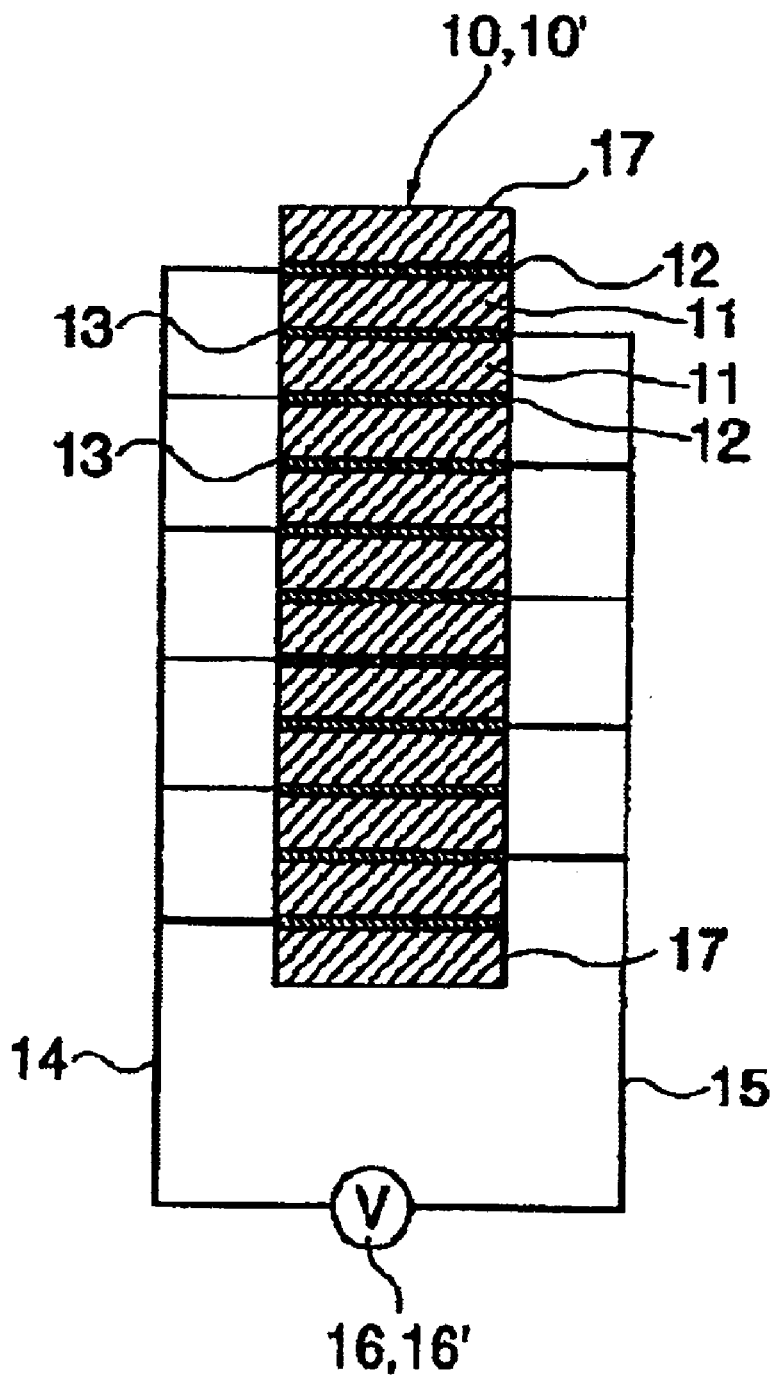
FIG. 2 is a schematic view showing the structure of a laminate-type piezoelectric element used in the actuator.

Details of the structure of the first piezoelectric element 10 and the second piezoelectric element 10' are shown in FIG. 2. In FIG. 2, the details are exaggerated in order to facilitate understanding of the structure. The laminate-type piezoelectric elements 10 and 10' are formed by alternating laminations of a plurality of ceramic thin plates 11 having piezoelectric characteristics such as PZT, and electrodes 12 and 13, and each ceramic thin plate 11 and electrodes 12 and 13 are fixed using an adhesive. The alternatingly arranged electrodes 12 and 13 are respectively connected to power source 16 and 16' via the signal leads 14 and 15. When a specific voltage is applied between the signal leads 14 and 15, an electric field is generated in the lamination direction at the ceramic thin plates 11 interposed between the electrodes 12 and 13. Every second electric field is in the same direction. Accordingly, the ceramic thin plates 11 are laminated such that the polarization direction of every second layer is identical, i.e., adjacent ceramic thin plates 11 have opposite polarization directions. At the bilateral ends of the piezoelectric elements 10 and 10' is provided a protective layer 17.

When an alternating current drive voltage is applied between the electrodes 12 and 13 from the power sources 16 and 16', all ceramic thin plates 11 repeatedly expand and contract in the same direction, such that the entirety of each piezoelectric element 10 and 10' expands and contracts. In this actuator, the piezoelectric elements 10 and 10' are used as an oscillation source, and displacement is expanded by resonating the elastic members 25 and 25'.

The first and second piezoelectric elements 10 and 10' are driven by AC signals having a mutual phase difference, so as to move the tip 20 in an ellipse. When, for example, the tip 20 is presses against the cylindrical surface of a rotor 40 which is rotatable about a specific axis, the elliptical movement (including circular movement) of the tip 20 can be converted to a rotational movement of the rotor 40. Furthermore, when, for example, the tip 20 presses against the flat surface of a rod-like member (not illustrated), the elliptical movement of the tip 20 can be converted to linear movement of the rod member. Since the tip 20 presses against the rotor 40 or the like, a spring 41 is provided for contact to the base 30. The material of the rotor 40 is desirably a light weight metal such as aluminum or the like, and the surface of the rotor 40 is desirably subjected to a an aluminum anodizing process to prevent wear through friction with the tip 20.

Figure 3:
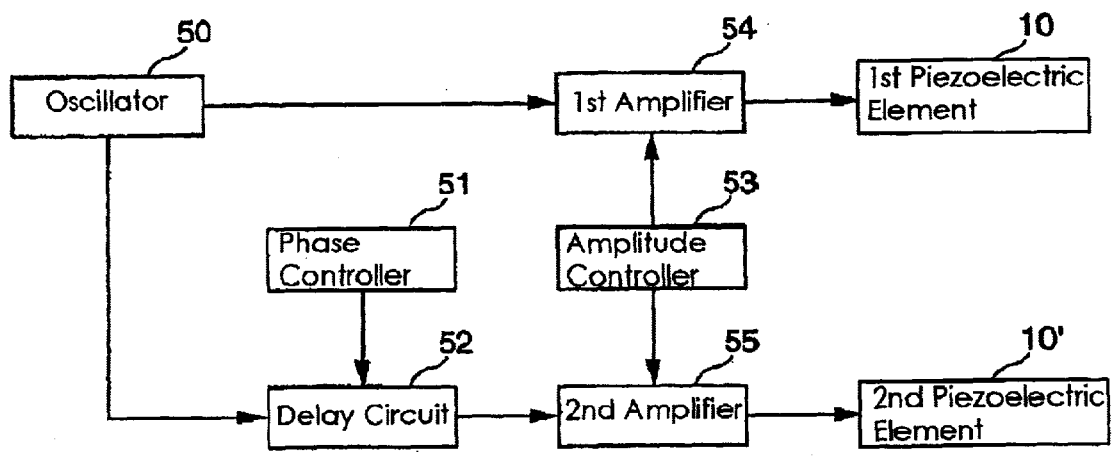
FIG. 3 is a block diagram of a drive circuit of the actuator.

A block diagram of the drive circuit is shown in FIG. 3. An oscillator 50 oscillates a sinusoidal wave signal at a specific frequency. A phase controller 51 controls a delay circuit 52 in accordance with rotational speed, drive torque, rotation direction and the like targeting the rotor 40 as the driven member. In this way the delay circuit 52 generates a sinusoidal wave signal of shifted phase relative to the sinusoidal wave signal generated by the oscillator 50. A amplitude controller 53 controls a first amplifier 54 and a second amplifier 55, so as to mutually amplify the two sinusoidal wave signals of shifted phase. The sinusoidal wave signals amplified by the first amplifier 54 and the second amplifier 55 are respectively applied to the first piezoelectric element 10 and the second piezoelectric element 10'.

Figure 4:
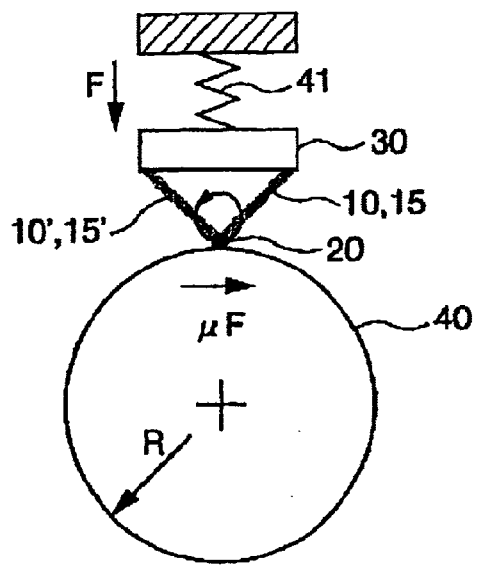
FIG. 4 illustrates the rotor rotation principle of the actuator.
Figure 5:
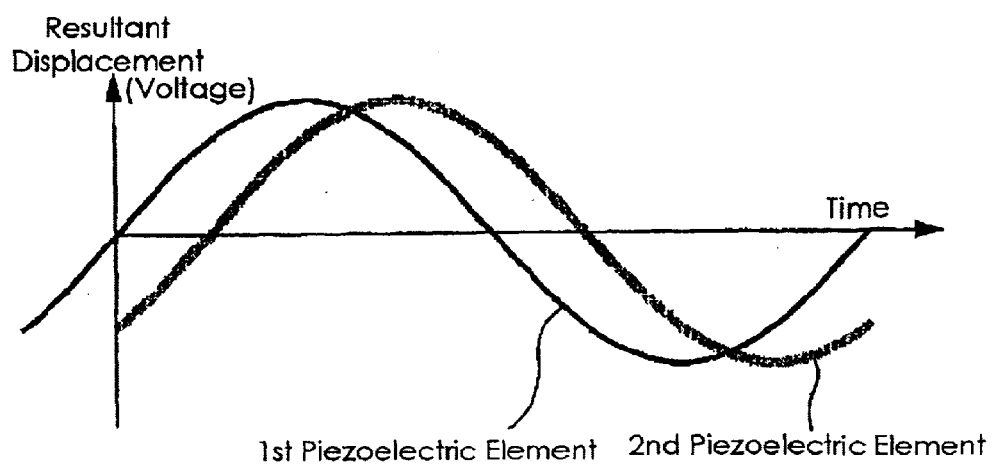
FIG. 5 illustrates the voltage applied to two piezoelectric elements and the resulting displacements.

The principle of rotation of the rotor 40 by the truss-type actuator is described below. FIG. 4 shows the actuator of FIG. 1 pressed against the rotor 40 by a spring 41 at a specific pressure F. In FIG. 4, the symbol $\mu$ represents the friction coefficient. the voltages applied to the first piezoelectric element 10 and the second piezoelectric element 10', and the resultant displacements are shown in FIG. 5. When sinusoidal wave signals of different phase shown in FIG. 5 are applied to the first piezoelectric element 10 and the second piezoelectric element 10', respectively, the tip 20 connected to the first piezoelectric element 10 and the second piezoelectric element 10' moves in an elliptical movement or circular movement in conjunction therewith.

When this tip 20 is forced toward the cylindrical surface 40a of the rotor 40 at a specific pressure by the spring 41, the driven tip 20 describes an elliptical path or a circular path and intermittently contacts the cylindrical surface of the rotor 40. During this time the rotor 40 is driven in a specific direction together with the tip 20 by the friction force acting between the cylindrical surface 40a and the tip 20. The tip 20 is continuously driven via the repeated application of sinusoidal wave signals to the first piezoelectric element 10 and the second piezoelectric element 10', and intermittently drives the rotor 40 at small angle in a specific direction. As a result, the rotor 40 is driven in rotation about its rotational axis.

When two mutually intersecting and independent movements are combined, the intersection point describes a path in accordance with an elliptical movement method (Lissajous method). In the actuator of the present embodiment, various paths can be obtained by changing the phase difference and amplitude of the drive signals used to drive the first piezoelectric element 10 and the second piezoelectric element 10'. The rotational direction, rotational speed, rotational force (torque) and the like of the rotor 40 can be controlled by controlling the path of the tip 20. Specifically, the rotational speed is increased if the diameter of the path of the tip 20 is increased in a tangential direction relative to the rotation direction of the rotor 40. The rotational force is increased if the diameter of the path of the tip 20 is increased in a normal line direction relative to the rotor 40. Furthermore, if the phase is reversed, the rotational direction can be reversed.

Figure 6A:
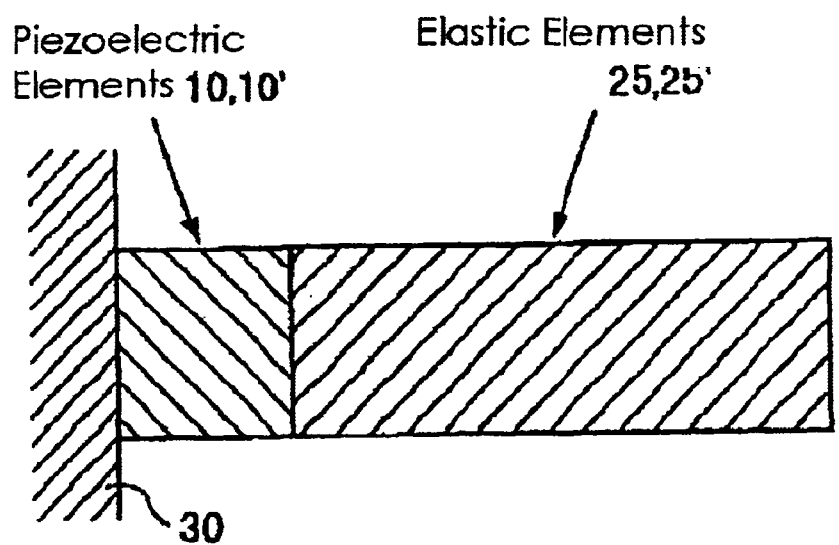
FIG. 6a is a schematic view of the displacement area comprising the piezoelectric element and elastic member in the actuator.
Figure 6B:
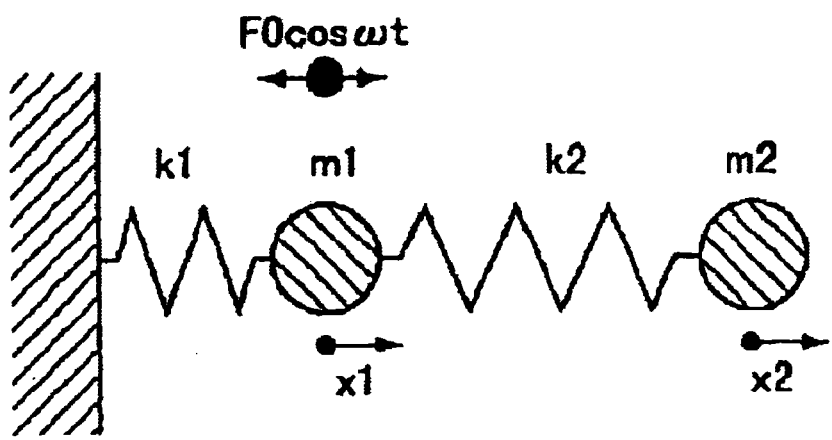
FIG. 6b is a schematic view showing the displacement area of FIG. 6a replacing an oscillation system using a spring and weight.

FIGS. 6a and 6b are schematic drawings respectively showing the displacement unit comprising the first piezoelectric element 10 and the second piezoelectric element 10' substituted for the displacement unit comprising an oscillation system of a spring and weight.

The mass of piezoelectric elements 10 and 10' and the elastic elements 25 and 25' are designated m1 and m2, the vertical oscillation spring constants are designated k1 and k2, the displacements from a standard length are designated X1 and X2, and the drive force (exciting force) generated by the piezoelectric elements 10 and 10' is designated F. The drive force when sinusoidal wave AC signals are applied to the piezoelectric elements 10 and 10' is drive force F=F0 cos ωt.

When the internal resistance of the oscillation system shown in FIG. 6b is ignored, the displacements (amplitudes) X1 and X2 of the piezoelectric elements 10 and 10' and the elastic elements 25 and 25' are expressed below.

$$X1 = F0 \cdot (k2 - m2 \cdot \omega^2)/(m1 \cdot m2 \cdot \omega^4 - (m1 \cdot k2 + m2 \cdot (k1+k2))\omega^2 + k1 \cdot k2) \quad (1)$$

$$X2 = F0 \cdot k2/(m1 \cdot m2 \cdot \omega^4 - (m1 \cdot k2 + m2 \cdot (k1+k2)) \cdot \omega^2 + k1 \cdot k2) \quad (2)$$

Figure 7A:
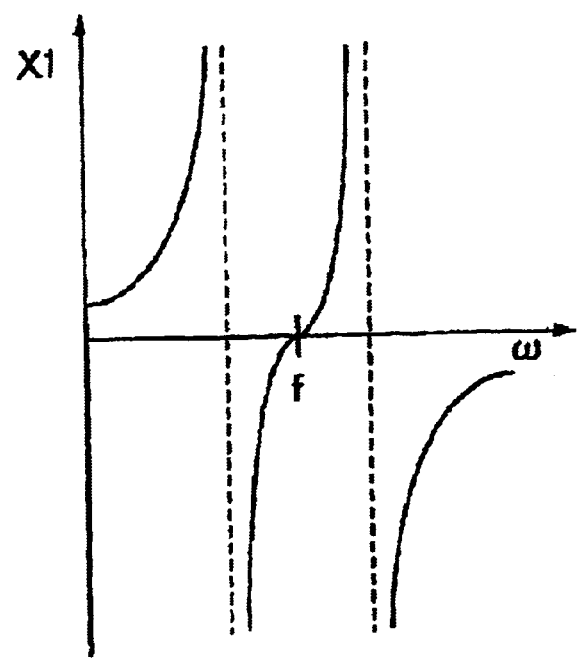
FIG. 7a illustrates the relationship between the frequency of the drive signal and the displacement of the piezoelectric element.
Figure 7B:
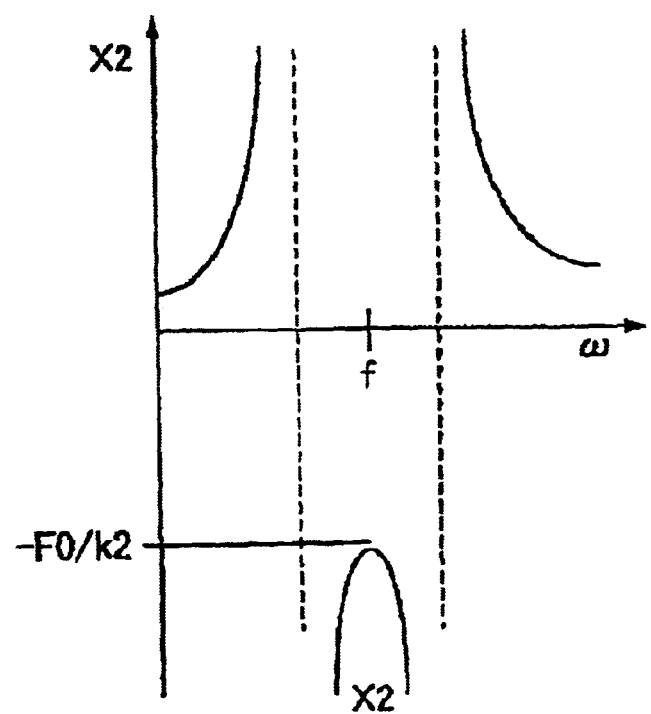
FIG. 7b illustrates the relationship between the frequency of the drive signal and the displacement of the elastic member.

The relationship between the frequency of the drive signal and the displacement (amplitude) X1 and X2 are shown in FIGS. 7a and 7b. As can be understood from FIG. 7a, at a specific frequency f (f=(k2/m2)$^{1/2}$), the displacement X1 of the piezoelectric elements 10 and 10' becomes zero [0]. In the present embodiment, the frequency f at which the displacement X1 of the piezoelectric elements 10 and 10' becomes zero is used to drive the piezoelectric elements 10 and 10'. In equation (1) above, the condition under which the displacement X1 of the piezoelectric elements 10 and 10' becomes zero is stated below.

$$k2 - m2 \cdot \omega^2 = 0, \text{ where } \omega^2 = k2/m2 \quad (3)$$

Each frequency satisfying this condition is equal to the simple natural frequency of the elastic members 25 and 25'. When the value ω satisfying equation (3) is substituted in equation (2), the following is obtained.

$$X2 = F0 \cdot k2/(m1 \cdot k2^2/m2 - m1 \cdot k2^2/m2 - (k1+k2) \cdot k2 + k1 + k2) = -F0/k2 \quad (4)$$

The displacement X2 of the elastic members 25 and 25' is equal to the extension from equation (4) when the drive force of the piezoelectric elements 10 and 10' is statically added to the elastic members 25 and 25'.

The negative sign on the displacement X2 (=−F0/k2) of the elastic members 25 and 25' reflects that the phase of the elastic members 25 and 25' are the opposite phase of the drive force (exciting force) of the piezoelectric elements 10 and 10'. That is, the oscillation of the elastic members 25 and 25' nullifies the oscillation of the piezoelectric elements 10 and 10'.

When the extension of the piezoelectric elements 10 and 10' with a static electric field applied is designated X0, F0=K1·X0, such that the following equation (5) is derived.

$$X2 = -X0 \cdot k1/k2 \quad (5)$$

The displacement of the elastic members 25 and 25' can be expanded more than the displacement of the static displacement of the piezoelectric elements 10 and 10' by making the spring constant k2 of the elastic members 25 and 25' smaller than the spring constant k1 of the piezoelectric elements 10 and 10' (k1>k2>1).

The spring constant k of a member formed of a homogenous material can be represented by K=SE/L when the member cross section is designated S, length is designated L, and coefficient of elasticity is designated E. Accordingly, the spring constants k1 and k2 of the piezoelectric elements 10 and 10' and the elastic members 25 and 25' can be controlled by design, and the displacement X2 of the elastic members 25 and 25' can be expanded by satisfying the relationship k1>k2>1.

As described above, when the piezoelectric elements resonate, impedance decreases and the current flow to the piezoelectric elements increases. Consider that this current increase mechanically oscillates the piezoelectric elements which generates electromotive force by the voltage effect on the piezoelectric element itself, and the current flows readily by matching the phase of the electromotive force and the phase of the drive signal. In the present embodiment, this phenomenon is used in reverse, by suppressing the mechanical oscillation of the piezoelectric element to reverse the phase of the electromotive force produced by the voltage effect to the opposite of the phase of the drive signal, to reduce the drive current (theoretically to zero [0]). Actually, although the conditions of internal resistance differ for the piezoelectric elements 10 and 10' and the elastic members 25 and 25', the displacement X1 of the piezoelectric elements 10 and 10' can be nullified by a frequency near the simple natural frequency of the elastic members 25 and 25', thereby minimizing the current of the drive signal. As a result, as an actuator, the a specific displacement amount (output) is assured, and the power consumption necessary for actuation can be reduced. Furthermore, since a laminate-type piezoelectric element is used as a displacement element, the drive voltage can be reduced.

Although displacement units comprising two groups of piezoelectric elements 10 and 10' and elastic members 25 and 25' for driving a tip 20 are arranged so as to intersect in the above described embodiment, the present invention is not limited to this arrangement inasmuch as other optional angles, such as, for example, 45°, 135° and the like also may be used. The number of displacement units is not limited to two, and groups of three or more displacement units may be used, so as to drive the displacement elements with three or four degrees of freedom. The actuator of the present invention is not limited to truss-type actuators, and may be an actuator such as a toric-type, π-type, impact-type and the like, and may be applied to general actuators of types which excite an elastic member by oscillation of a piezoelectric element.

Although the present invention has been fully described by way of examples with reference to the accompanying drawings, it is to be noted that various changes and modifications are apparent to those skilled in the art. Therefore, unless such changes and modifications depart from the scope of the present invention, they are to be construed as being included therein.

What is claimed:

1. An actuator comprising:
    a displacement element for generating a specific displacement;
    a displacement expander for transmitting the displacement of said displacement element and expanding the displacement;
    a transmitter for transmitting the displacement expanded by said displacement expander to a driven member;
    a presser for pressing said transmitter against the driven member; and
    a driver for driving the displacement element by providing a drive signal that oscillates the displacement element at a first phase angle and oscillates the displacement expander at a second phase angle substantially supplementary to said first phase angle, thereby causing oscillations of said displacement element to be restrained by oscillations of said displacement expander.

2. An actuator as claimed in claim 1, wherein the spring constant of said displacement expander is less than the spring constant of said displacement element.

3. An actuator as claimed in claim 2, wherein said displacement element is driven by the drive signal, wherein the drive signal has a frequency near the simple natural frequency of said displacement expander, and wherein said simple natural frequency of the displacement expander is different than the simple natural frequency of the displacement element.

4. An actuator as claimed in claim 1, wherein said displacement element is driven by the drive signal, wherein the drive signal has a frequency near the simple natural frequency of said displacement expander, and wherein said simple natural frequency of the displacement expander is different than the simple natural frequency of the displacement element.

5. An actuator as claimed in claim 1, wherein said displacement element is a laminate-type piezoelectric element.

6. An actuator comprising:
 a first displacement element for generating a specific displacement;
 a second displacement element for generating a specific displacement of which a direction is cross to a direction of the specific displacement of said first displacement element;
 a first displacement expander, which is connected in series to said first displacement element, for transmitting the displacement of said first displacement element and expanding the displacement;
 a second displacement expander, which is connected in series to said second displacement element, for transmitting the displacement of said second displacement element and expanding the displacement;
 a tip member, which is arranged at an intersection end of said first and second displacement elements, for transmitting the displacement expanded by said first and second displacement expanders to a driven member;
 a presser for pressing said tip against the driven member; and
 a driver for driving each of said first and second displacement elements by providing a first drive signal that oscillates the first displacement element at a first phase angle and oscillates the first phase angle, and by providing a second drive signal that oscillates the second displacement element at a third phase angle and oscillates the second displacement expander at a fourth phase angle substantially supplementary to said third phase angle, thereby causing oscillations of said first and second displacement elements to be restrained by oscillations of said first and second displacement expanders.

7. An actuator as claimed in claim 6, wherein the spring constants of said first and second displacement expanders are respectively less than the spring constants of said first and second displacement elements.

8. An actuator as claimed in claim 7, wherein said first and second displacement elements are respectively driven by said first and second drive signals, wherein each of said first and second drive signals has a frequency near the simple natural frequency of said first and second displacement expanders, respectively, and wherein the simple natural frequency of the first displacement expander is different than the simple natural frequency of the first displacement element and the simple natural frequency of the second displacement expander is different than the simple natural frequency of the second displacement element.

9. An actuator as claimed 6, wherein said first and second displacement elements are respectively driven by said first and second drive signals, wherein each of said first and second drive signals has a frequency near the simple natural frequency of said first and second displacement expanders, respectively, and wherein the simple natural frequency of the first displacement expander is different than the simple natural frequency of the first displacement element and the simple natural frequency of the second displacement expander is different than the simple natural frequency of the second displacement element.

10. An actuator as claimed in claim 6, wherein said first and second displacement elements are respectively laminate-type piezoelectric elements.

11. An actuator comprising:
 a displacement element for generating a specific displacement;
 a displacement expander for transmitting the displacement of said displacement element and expanding the displacement, said displacement expander having elasticity in the direction of said displacement;
 a transmitter for transmitting the displacement expanded by said displacement expander to a driven member;
 a presser for pressing said transmitter against the driven member; and
 a drive for driving said displacement element,
 wherein the driver includes an oscillator for providing a drive signal that oscillates the displacement element at a first phase angle and oscillates the displacement expander at a second phase angle substantially supplementary to said first phase angle, thereby causing said specific displacement of said displacement element to be restrained by contractions or expansions of said displacement expander.

12. An actuator as claimed in claim 11, wherein the spring constant of said displacement expander is less than the spring constant of said displacement element.

13. An actuator as claimed in claim 12, wherein said displacement element is driven by the drive signal, wherein the drive signal has a frequency near the simple natural frequency of said displacement expander, and wherein said simple natural frequency of the displacement expander is different than the simple natural frequency of the displacement element.

14. An actuator as claimed in claim 11, wherein said displacement element is driven by the drive signal, wherein the drive signal has a frequency near the simple natural frequency of said displacement expander, and wherein said simple natural frequency of the displacement expander is different than the simple natural frequency of the displacement element.

15. An actuator as claimed in claim 11, wherein said displacement element is a laminate-type piezoelectric element.

16. An actuator as claimed in claim 1, wherein the drive signal has a driving frequency based on at least one physical property of the displacement expander.

17. An actuator as claimed in claim 16, wherein said at least one physical property includes at least one of a mass of the displacement expander and a spring constant of the displacement expander.

18. An actuator as claimed in claim 17, wherein the driving frequency satisfies the relationship:

$$f=(k/m)^{1/2}$$

wherein f is the driving frequency, k is the spring constant of the displacement expander, and m is the mass of the displacement expander.

19. An actuator as claimed in claim 6, wherein the first drive signal has a first driving frequency based on at least one physical property of the first displacement expander, and wherein the second drive signal has a second driving frequency based on at least one physical property of the second displacement expander.

20. An actuator as claimed in claim 19, wherein each said at least one physical property includes at least one of a mass of the respective displacement expander and a spring constant of the respective displacement expander.

21. An actuator as claimed in claim 20, wherein the each of the first and second driving frequencies satisfies the relationship:

$$f=(k/m)^{1/2}$$

wherein f is the respective driving frequency, k is the spring constant of the respective displacement expander, and m is the mass of the respective displacement expander.

22. An actuator as claimed in claim 11, wherein the drive signal has a driving frequency based on at least one physical property of the displacement expander.

23. An actuator as claimed in claim 22, wherein said at least one physical property includes at least one of a mass of the displacement expander and a spring constant of the displacement expander.

24. An actuator as claimed in claim 23, wherein the driving frequency satisfies the relationship:

$$f=(k/m)^{1/2}$$

wherein f is the respective driving frequency, k is the spring constant of the displacement expander, and m is the mass of the respective displacement expander.

* * * * *

UNITED STATES PATENT AND TRADEMARK OFFICE
CERTIFICATE OF CORRECTION

PATENT NO. : 6,700,305 B2
DATED : March 2, 2004
INVENTOR(S) : Shinya Matsuda et al.

It is certified that error appears in the above-identified patent and that said Letters Patent is hereby corrected as shown below:

Column 7,
Line 36, delete "oscillates the first phase angle", and insert -- oscillates the first displacement expander at a second phase angle substantially supplementary to said first phase angle --.

Column 8,
Line 19, delete "drive", and insert -- driver --

Signed and Sealed this

Fourteenth Day of December, 2004

JON W. DUDAS
*Director of the United States Patent and Trademark Office*